United States Patent [19]
Gee et al.

[11] 3,840,244
[45] Oct. 8, 1974

[54] HAUL UNIT SUSPENSION SYSTEM

[75] Inventors: James E. Gee, Washington; Raymond L. Moser, Tremont; Albert L. Woody, Peoria, all of Ill.

[73] Assignee: Caterpillar Tractor Co., Peoria, Ill.

[22] Filed: Nov. 19, 1973

[21] Appl. No.: 416,851

[52] U.S. Cl. .............................. 280/124 R, 280/489
[51] Int. Cl. ........................................... B62d 53/00
[58] Field of Search ............ 280/124 R, 124 F, 489

[56] References Cited
UNITED STATES PATENTS
3,135,529  6/1964  Conrad ............................. 280/489
3,311,389  3/1967  Barton ............................. 280/489

Primary Examiner—Philip Goodman
Attorney, Agent, or Firm—Phillips, Moore, Weissenberger Lempio & Strabala

[57] ABSTRACT

A suspension system for a material haul unit used in earthworking operations including a standard axle stabilizing A-frame reversed and coupled at its apex to the rear bumper of the unit. The wheels and axle housing are mounted forwardly of their usual positions and suspension struts are provided beneath the body of the unit for substantial vertical alignment of the wheels, axle housing, struts, and rearward support structure of the body, thereby providing direct support to the rearward portion of the unit. A radius arm pivotally mounted to the axle housing and unit frame provides lateral oscillation and stability for the suspended unit.

10 Claims, 2 Drawing Figures

3,840,244

HAUL UNIT SUSPENSION SYSTEM

BACKGROUND OF THE INVENTION

This invention relates to improvements in heavy-duty earthmoving and material haulage equipment and more particularly to an improved suspension system for a material hauling vehicle.

Operator discomfort occasioned by the harsh bouncing and jolting of heavily loaded, fast-moving material haul units such as wagons, and premature structural failure have prompted the provision of haul unit suspension systems which minimize operator discomfort, and detrimentally high stress concentrations. Exemplary of such suspension systems are those described in U.S. Pat. Nos. 3,311,389, of common assignment herewith, 3,135,529, and 3,118,686 to Barton et al., Conrad and McAdams respectively.

Often such systems have also included liquid cushioning means for damping the bounce and pitch sometimes associated with operation of material hauling units.

Numerous prior art attempts have been made to provide effective, durable and resilient support means for fast moving, heavily loaded haul units such as wagons and scrapers of the type described in U.S. Pat. Nos. 3,254,920; 3,558,190 and 3,726,540, of common assignment herewith with reasonable economy. Typically, the suspension systems employed in conjunction with standard haul units have support beams which are disposed with respect to the body structure so as to be highly stressed during loaded opeation of the haulage unit. These stresses increase as the rearwardly disposed axle housing and support struts become subject to the high transient loading concomitant to high speed operation. The problem is particularly pronounced in large units such as those designed to haul as much as 100 tons of material. In such units, the beams and other support structure, particularly cantilevered braces, are subject to the normal static load stresses in addition to alternating tensile and compressive stresses during speed operations and such stresses act upon the weld joints to result often in premature equipment failure.

SUMMARY AND OBJECTS OF THE INVENTION

The instant invention provides a haul unit suspension system with support means including a reversed position standard axle stabilizing A-frame and ball coupling means for joining the apex of such A-frame to the rear bumper member of the haul unit. A plurality of suspension struts are disposed below the body of the unit and the wheels and axle are forwardly mounted from their usual position so that the wheels, axle housing and struts are in substantially vertical alignment, thereby affording strong support in a substantially vertical plane directly beneath the rigid rearward portion of the body section. A pivotally mounted radius arm provides a pivot connection between the axle housing and body to afford an oscillation capacity and lateral stability for the body of the unit.

It is an object of the invention to provide a resilient suspension system with superior load distribution and absorption in the haul unit body while substantially eliminating some of the deleterious transient loading usually extant in cantilevered support structure.

It is a further object to permit the substantial lateral oscillation of the unit body so as to reduce shock loads more effectively than with conventional straight longitudinal pivoting axle systems which do not permit such oscillation.

A further object is to provide a rear supporting structure for a haul unit made of lighter and more economical materials and by more efficient methods yet more effective and durable in operation.

Another object of this invention is to provide a suspension system for material haul units which effectively reduces shock loading on the unit body.

Yet another object of this invention is to provide a suspension system for material haul units permitting the employment of an unpowered rear axle system.

Other objects and advantages of the invention will become apparent from the following description and drawing.

DETAILED DESCRIPTION

Figure 1:
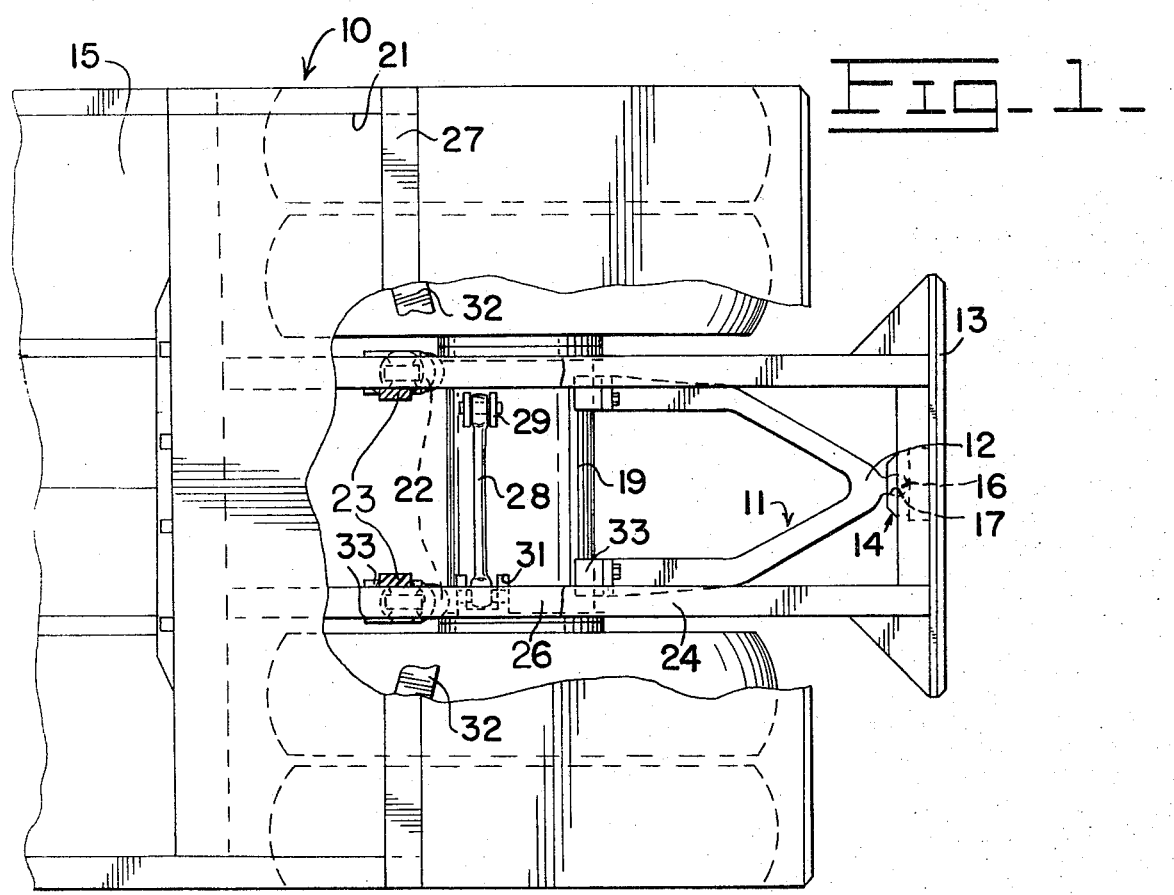
FIG. 1 is a partially cut-away plan view of a material haul unit showing the suspension system of this invention.
Figure 2:
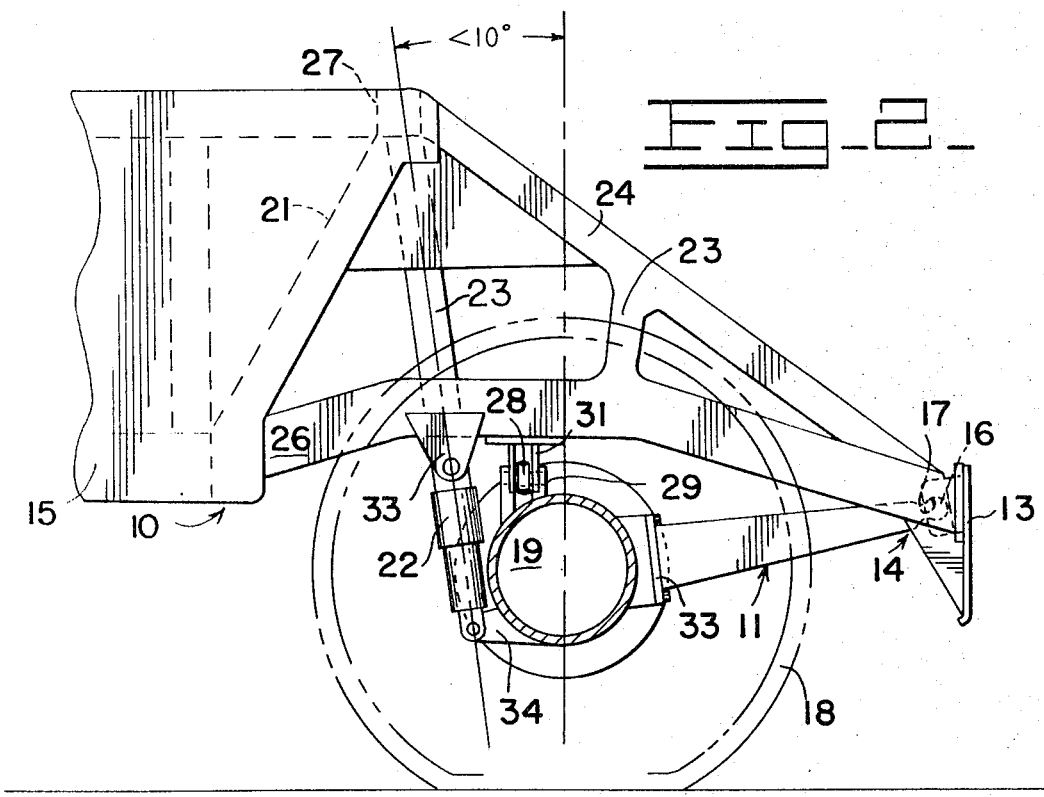
FIG. 2 is a partial elevation of the haul unit of FIG. 1.

With reference to the drawing, the rear portion of a material haul unit such as a wagon 10 includes a standard axle stabilizing A-frame shown generally at 11 pivotally supported at its apex 12 upon a rear bumper member 13 of the body 15 of the wagon. The A-frame 11 is joined to the bumper member 13 by means of a coupling 14, which preferably includes a ball 16 on the apex 12 and a mating socket 17 on the bumper member 13.

Preferably, the rear wheels 18 and an axle housing 19 are disposed closely proximate to a box section 21 of the unit body to permit the placement of a pair of laterally spaced resilient suspension struts 22 immediately below the box section 21 to afford support to the body 15 in a substantially vertical plane directly beneath the strong and rigid box section. As used herein, the term "vertical" indicates a direction normal to a longitudinal axis of the unit. That is, for the purpose of this description the haul unit shown in the drawing should be considered disposed upon a flat plane parallel to the horizon.

The rear supporting structure of the body 15 includes substantially vertically disposed reinforcing beams 23 and diagonal reinforcing beams 24 supporting a plurality of longitudinally extending main body beams 26. Reinforcing beams such as 23 and 24 are typically subjected to high compressive and bending stresses, especially when the axle housing 19 and suspension struts 22 are subjected to fluctuating loading during high speed operation. The instant relative vertical alignment of the wheels 18, axle housing 19, struts 22, and beams 23, however, and the alignment of a rear upper cross beam 27 with the struts 22, provides a good distribution of the incurred stresses to all members and particularly it substantially eliminates the alternate tensile and compression forces which would have resulted had these members been supported by the usual cantilever type support arrangement.

Preferably, the A-frame 11 and the struts 22 are attached to the axle housing 19 and main body beams 26 as by mounting brackets 33 and ears 34 respectively to assure maintenance of the relative normal disposition of these parts.

The lateral oscillation and stability for the suspension is afforded by the A-frame 11 and resilient struts 22 so as to reduce shock loading. Such osicllation may be increased by the provision of a transversely extending radius arm 28 which is disposed forwardly of the axle housing 19 and which is pivotally mounted within a pair of brackets 19 and 31 attached respectively to the axle housing 19 and to the underside of one of the main body beams 26. The radius arm 28 also increases lateral stability in the suspension system.

Advantageously, a plurality of laterally extending cross braces 32 between beams 23, 24, and 26 are provided to assure maximum strength and rigidity in the wagon body support structure.

The configuration is such that the angle α between a line passing through the struts 22 and braces 32 and a vertical line passing through the axis of the axle is preferably 0° and in no case more than 10°.

It will also be noted that the pivot connection 16, 17 for the A-frame is disposed behind the bumper member in a protected area. The connection may be readily reached for servicing or inspection.

In the preferred configuration, all rigid joints, such as between the members 23 and 26 and the members 32 and 23, are welded.

It may be seen that the suspension system of the present invention provides simple, economical and resilient suspension means for effectively distributing and absorbing high stress loads experienced by a haul unit body. The substantially vertical alignment of the major support and supporting members substantially eliminates deleterious transient loading of the suspension support structure, while permitting substantial lateral axle oscillation to reduce shock loads on the unit body.

Additionally, when unpowered rear axle systems are used in conjunction with the haul unit, the gearing of both final drives and the differential may be omitted, and a simple plate installed to close a center axle hole provided for mounting the differential case and transmission.

With the instant arrangement, the rear support structure of the wagon 10 may be made lighter in weight and more economical while retaining effectiveness and durability. The A-frame disposition tends to strengthen the rear bumper member 13 and the rearward portion of the main body beams 26 along a longitudinal axis because the ball joint 16 and A-frame 11 are disposed on the low, substantially horizontal plane of the axle. During a pushing operation, the inherent rolling resistance of the wheels 18 tends to counteract the pushing force encountered through the A-frame 11 and remove much of such loading from the body beams 26.

While the invention has been described with particular reference to the preferred embodiment, it is apparent that variations and modifications are possible within the purview of the inventive concepts. No limitations with respect to such variations and modifications is intended, except by the scope of the appended claims.

We claim:

1. A suspension system for a longitudinally extending earthmoving haul unit having a body and having axle mounted wheels for said body, said suspension system including; laterally disposed axle housing means extending between said wheels for protectively shielding said axle, frame support means rigidly connected to said body and extending rearwardly of said body, pushing means for selectively transmitting pushing force to said body and for protecting the rear portion of said body, said frame support means being rigidly connected to said pushing means, A-shaped frame means connected between said pushing means and said axle housing means for stabilizing said axle housing means with respect to said frame support means and for permitting oscillation of said axle housing with respect to said body, said A-shaped frame means including an apex portion and two spaced-apart leg portions, said apex portion being movably mounted upon said pushing means and said leg portions being connected to said axle housing means.

2. The invention of claim 1 further including resilient support strut means connected between said axle housing means and a portion of said frame support means for resiliently supporting said body and said frame support means upon said axle housing means, said resilient support strut means being disposed in a first plane substantially coincident with a plane containing the longitudinally outermost extending portion of said body, said first plane being substantially normal to a longitudinal axis of said haul unit.

3. The invention of claim 1 wherein said apex of said A-shaped frame means is pivotally mounted upon said pushing means by means of a ball and socket connection.

4. The invention of claim 2 further including radius arm means pivotally connected between said axle housing means and a portion of said frame support means for preventing longitudinal movement of said axle housing means with respect to said body while permitting oscillation of said axle housing means in a plane normal to said longitudinal axis of said haul unit.

5. The invention of claim 1 wherein said frame support means include a pair of laterally spaced substantially longitudinally extending main beam members rigidly connected between said outermost extending portion of said body and said pushing means.

6. The invention of claim 5 wherein said frame support means further include a pair of reinforcing beam members extending from said body to said pushing means in two parallel second planes which are normal to said axle and which also contain respectively one of said pair of main beam members, said reinforcing beam members being disposed obliquely with respect to said main beam members and said longitudinal axis of said haul unit.

7. The invention of claim 6 wherein said frame support means further include a plurality of brace members disposed within said parallel second planes and rigidly connecting said main beam members and said reinforcing beam members.

8. The invention of claim 7 wherein said brace members are welded to said main beam members and said reinforcing beam members.

9. The invention of claim 7 wherein said frame support means further include a plurality of crossmembers extending laterally between said two parallel second planes and connecting said plurality of brace members.

10. The invention of claim 4 wherein the angle between said plane of oscillation of said axle housing and said first plane is less than 10°.

* * * * *